United States Patent [19]
Gold

[11] Patent Number: 4,847,977
[45] Date of Patent: Jul. 18, 1989

[54] METHOD OF INSTALLING A VEHICLE REAR WINDOW

[76] Inventor: Peter N. Gold, 465 N. Wood Rd., Rockville Centre, N.Y. 11570

[21] Appl. No.: 290,760

[22] Filed: Dec. 27, 1988

Related U.S. Application Data

[63] Continuation-in-part of Ser. No. 172,806, Mar. 28, 1988, abandoned, which is a continuation-in-part of Ser. No. 31,752, Mar. 30, 1987, abandoned.

[51] Int. Cl.[4] ............................................. B23P 11/00
[52] U.S. Cl. .......................................... 29/446; 29/460; 29/525.1; 296/201
[58] Field of Search ............... 29/446, 525.1, 460; 52/208; 65/106; 156/91, 108; 296/201

[56] References Cited

U.S. PATENT DOCUMENTS

| | | | |
|---|---|---|---|
| 2,608,279 | 8/1952 | Pearse | 52/208 |
| 3,155,204 | 11/1964 | Campbell et al. | 156/108 X |
| 3,245,182 | 4/1966 | Zierold | 52/208 |
| 3,462,189 | 8/1969 | Kauthekar | 296/201 X |
| 3,478,476 | 11/1969 | Kemp | 52/208 |
| 3,919,022 | 11/1975 | Stefanik | 156/108 X |
| 4,434,593 | 3/1984 | Horike et al. | 52/208 |
| 4,805,363 | 2/1989 | Gold | 52/208 |

Primary Examiner—Howard N. Goldberg
Assistant Examiner—Andrew E. Rawlins
Attorney, Agent, or Firm—Myron Amer

[57] ABSTRACT

A glass window installed in a curved window opening of a vehicle by placing along the edge bounding said curved window opening, window-engaging fastening means. A window pane sized to fit into said window opening is flexed from an initial flat configuration into a conforming curvature of said window, while establishing engagement between said flexed window pane and said window-engaging fastening means, to temporarily hold said window pane in said conforming curvature. A weather-sealing adhesive compound placed along the confronting edges of said window pane and window opening to complete a weatherproof installation of said window pane.

1 Claim, 1 Drawing Sheet

U.S. Patent  Jul. 18, 1989  4,847,977
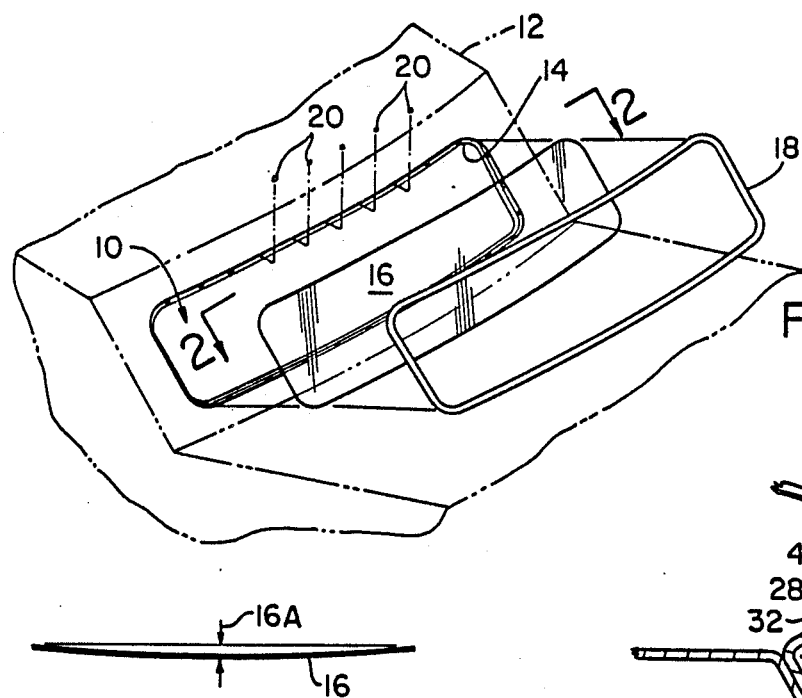
Fig.1 PRIOR ART
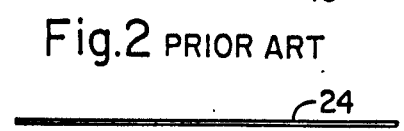
Fig.2 PRIOR ART
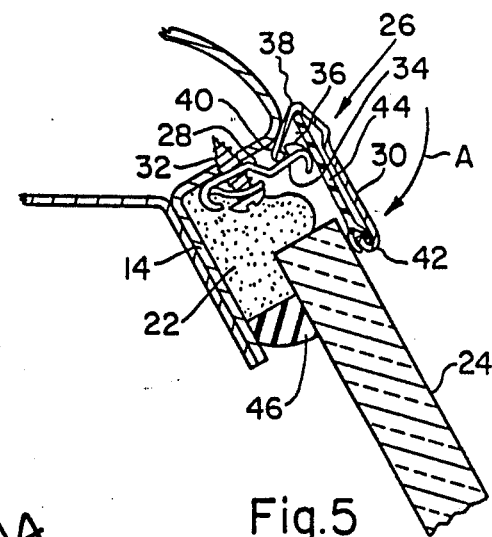
Fig.5
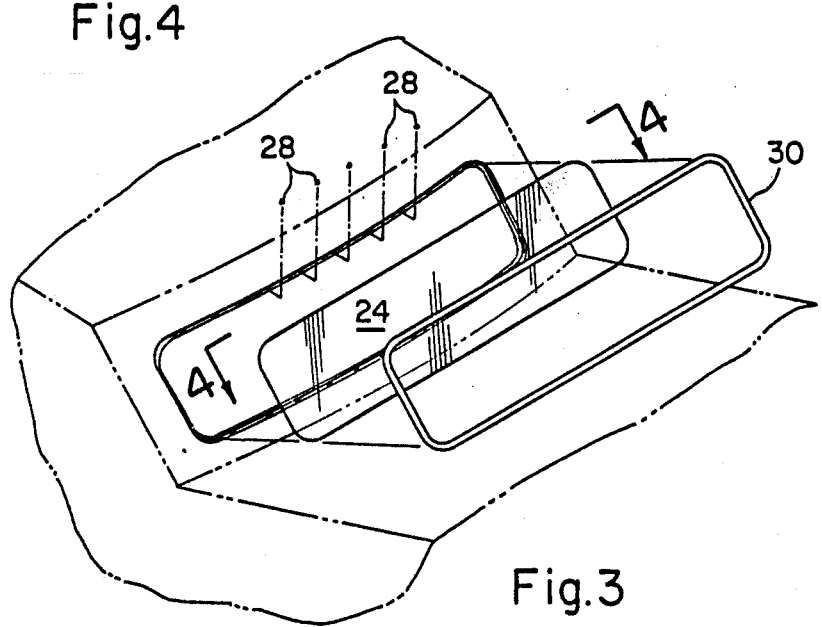
Fig.4
Fig.3

METHOD OF INSTALLING A VEHICLE REAR WINDOW

The present application is a continuation-in-part of application Ser. No. 172,806, filed Mar. 28, 1988, now abandoned, which is a continuation-in-part of application Ser. No. 031,752, filed Mar. 30, 1987, now abandoned, for which all equitable rights are claimed.

BACKGROUND OF THE INVENTION

The present invention relates to a process for mounting glass panels in curved window bays of motor vehicles and the like, and in particular, to a method for utilizing flat, uncurved glass panels to form curved windows in such vehicles.

In modern automobiles, the use of highly curved pre-contoured and pre-stressed front windshields is very apparent to all observers. Not so apparent, is the fact that the rear window and the side quarter windows are also curved, although to an extent which is considerably less than that of the front windshield. Further, the curvature is generally only in a single and longitudinal direction of the glass. however, at present, the process of installing even these slightly curved panels is basically identical to the process by which the highly complexedly curved front windshield is installed. Specifically, even the slightly curved windows are pre-contoured by expensive, annealing and tempering processes, employing expensive molds, and are then set in the conforming recessed flange of window bays.

The conventional process has many disadvantages, amongst which is the fact that the glass panel is distorted during the tempering and contouring process and is caused to become less flexible and more brittle. In addition, problems arise in packaging such glass for transportation and storage. While, glass that is pre-contoured does, however, become stronger relative to perpendicular shock and strain, it does become significantly weaker at the same time in other respects, in that it does not thereafter readily flex. Consequently, in a vehicular accident, it can easily dislodge from the bay in which it is set, "pop" out of the vehicle, and easily shatter. On the other hand, untreated flat glass, or even chemically treated flat glass which has not been pre-contoured or tempered, is less rigid and less brittle thereby being more flexible and bendable so that in the event of a vehicular accident, it is less likely to shatter and more likely to absorb any shock and strain applied to it.

Additionally, when pre-contoured glass breaks during an accident, the vehicular body is less able to resist crushing because the window is without the structural support furnished by the glass normally filling the same. Thus, during an accident, the roof of the car is apt to collapse upon the occupants during a turn-over where there is no glass in the window opening than when the glass remains intact therein.

Most importantly, the cost of a comparably sized flat glass panel is at least one eighth to one tenth the cost of a pre-treated, pre-contoured glass. Coupling such cost with the added cost for packaging and shipment of pre-contoured glass panels, the difference in eventual expense to the consumer is considerable.

It is the object of the present invention to provide an improved process, overcoming the disadvantages enumerated above. In particular, it is an object of the present invention, to provide a process wherein flat uncontoured glass can be applied in the vehicle window, wherein it is made to assume in situ a curved shape.

It is a further object of the present invention to provide a process for economically and inexpensively installing glass windows of a curved nature in vehicle windows and the like.

More particularly, in the within inventive method in which a flat glass is flexed and used as a closure for a curved window opening and, as will be described in greater detail herein, a phenomenon that has been organized and underlies the present invention is that flexing of the flat glass producing an urgency therein to return from its flexed to its flat shape. This urgency is used to advantage to enable the application of adhesive sealant which, when cured, permanently holds the glass in place within the cooperating window opening. More specifically, in the within inventive method, one of the steps consists of, after placing the flexed glass in place against reveal molding, applying a continuous bead of adhesive sealant into the space between the edge of the glass window panel and the window opening by the flexing of the window panel outwardly against said reveal molding.

The foregoing objects and advantages, together with numerous advantages are set forth in the following disclosure.

SUMMARY OF THE INVENTION

According to the present invention, the method for installing a window panel in a curved opening of a vehicle, comprises the steps of placing a flat uncontoured glass panel within the curved window bay, securing along the edge of the bay bounding the curved window opening, a holding means sufficient to engage and maintain the flat glass in the curved window opening, said glass panel being flexed from its initial flat configuration into the conforming curvature of the window, and thereafter applying a weather sealant and adhesive compound in situ along the confronting edges of the window panel and allowing said adhesive to cure until the panel becomes fixed permanently in the window opening in its conforming curvature.

The fastening means comprises a plurality of resilient clips uniformly spaced about the perimeter of the window bay and a reveal molding cooperatively secured to the clips, so that the reveal molding is provided with a resilient bias, pressing on the outer surface of the glass panel, pushing the glass into conforming engagement with the bay of the window opening.

Full details of the present invention are set forth in the following description of the preferred method, as illustrated in the accompanying drawings.

DESCRIPTION OF THE DRAWINGS

FIG. 1 is a partially exploded perspective view of the rear window of an automobile, showing the application of a conventionally pre-curved window thereto, according to the prior art;

FIG. 2 is a top view of the glass panel of the prior art taken in the direction of 2—2 of FIG. 1;

FIG. 3 is a view similar to that of FIG. 1 showing the application of the present method to the installation of a flat glass panel in an automobile window;

FIG. 4 is a top view of the flat glass panel employed in the method shown in FIG. 3; and FIG. 5 is a sectional view, greatly enlarged, showing the completed window installation.

DESCRIPTION OF THE INVENTION

The present invention is illustrated and described herein for simplicity, with reference only to the installation of glass in the rear window of an automobile. It will be understood, however, that the same principles apply to installations in other vehicle windows, or the like.

As seen in FIG. 1, the rear window bay, generally depicted by the numeral 10, of automobile 12 is defined by the roof flange into a rectalinear frame 14 having an L-shaped cross-section. A panel of curved glass 16, as seen in FIG. 2 is inserted, into the frame 14 and a metal reveal molding 18 is secured thereabout. In this arrangement, the glass panel 16, is pre-contoured in the manner illustrated in FIG. 2 by being bowed an amount 16A in the longitudinal direction, to have a concave/convex configuration. Similarly, the reveal molding 18 is bowed accordingly. As seen in FIG. 1, the pre-contouring of both the glass panel 16 and the reveal molding 18, enables the installation of the two quite easily. The reveal molding 18, is held from falling out by a plurality of clips 20 uniformly spaced about the periphery of the window opening or bay. The glass 16 is held by continuous bead 22 of curable adhesive material applied along the perimeter of the glass panel 16 forming a bond and weatherproof seal between the panel 16 and the frame 14. The reveal molding encloses the peripheral edge of the glass panel, but it does not co-act with the clips and/or with the glass to hold the glass, let alone effect any flexing of the glass.

In comparison to the prior art, the present invention as illustrated in FIGS. 3 to 5, provides for the installation of inexpensive flat glass and the in situ flexing of the glass to conform to a curved window bay. The vehicle 12 and its window opening or bay 10, are of course, identical with that shown in FIG. 1 since such is solely within the purview of the automobile designer and would be prohibitive to change. Nevertheless, in accordance with the invention, a glass panel 24, rather than being pre-contoured, is supplied flat, uncontoured and untempered, but sized and shaped overall so as to readily fit the opening bay 10 of the window. The flat glass panel 24 is placed within the bay 10 being flexed slightly by hand to conform to the contour of the bay and placed into engagement with perimeter fastening means generally depicted by the numeral 26 provided to hold the glass panel 24 to least temporarily in place.

As seen in FIG. 5, the fastening means 26 is formed of a combination of individual resilient clips 28 and a reveal molding 30. The individual clips 28 are arranged uniformly about the perimeter of the bay 10 and are secured firmly in place by an anchoring screw 32, tapped into the back wall of the frame 14. Each clip 28 has an outwardly extending leaf portion 34 on which is integrally formed a detent 36.

The reveal molding 30 is uniform through its perimeter, and as seen in cross-section (FIG. 5) is provided with a triangular shaped head 38 having a flange 40 adapted to engage the detent 36 on the clip. The triangular shaped head 38 is adapted to snap on to the leaf part 34 of each clip 28 so as to be held firmly between the back wall of the frame 14 and detent 36. Each of the clips 28 simultaneously urge the reveal molding 30, in cross-section arc, in clockwise arc, (arrow A) inwardly and downwardly into the window bay 10 whereby the lower end 42 of the molding 30 engages and presses onto the face of the glass panel 24. Under this collective urging, the lower end 42 or inner edge of the reveal molding acts as a securing element effecting and maintaining flexure of the glass panel continuously about its perimeter. The lower end 42 of the molding 30 is bent to provide an inturned edge on which a continuous band of weather stripping 44 is secured, the weather stripping extending into engagement with the leaf portion 34 of clip 28.

At this point it is significant to note that the glass panel 24 is not yet permanently mounted in its position in the window opening 10 and relative to the reveal molding 30. The permanent mounting thereof is achieved using the same prior art adhesive sealant 22 that is inserted in the compartment between the panel 16 and the frame 14. However, it is one of the features of the within inventive method that there will be adequate clearance for the placement of the adhesive sealant 22 behind the peripheral edge of the flexed glass panel 24 because the flexing produces an urgency therein which forces this peripheral edge outwardly and thus into contact with the reveal molding clip portions 30, and thus providing an opening for inserting the adhesive sealant mass 22 in the glass-holding position as illustrated in FIG. 5.

Within the frame 14 and after insertion of the adhesive sealant 22, the within inventive method contemplates the placement of a continuously extending dam 46 of elastic material placed so that it lodges along the inner wall of the frame 14 adjacent the periphery of the window bay 10 in contact with the inner surface of the glass panel 24. The dam 46 acts as a closure for the continuous bead 22 of adhesive sealant of material which was previously placed within frame 14 in an amount sufficient to engage with, and bond with, the confronting inner surface and peripheral edge of the glass panel 24. The flat uncontoured glass 24 is held in place by engagement with the fastener means 26 until the adhesive 22 cures and bonds, thereby setting the glass panel permanently in place. The action of the biased reveal molding and the adhesive, maintains the glass panel 24 permanently curved and in place.

Conventional tempered or untempered flat glass panels of rear vehicle window size, e.g., 18×60 inches and ⅛ inch thick, are easily flexed in situ and can be employed here.

Preferably the reveal molding 30 is also supplied and used as a straight member being unbent and uncontoured prior to installation in the window. It is, however, sufficiently flexible to be held by the clips 28 spaced along the flange bounding the window bay 10.

The curable adhesive is preferably polysulfide, having suitable fillers and solvents added thereto so that when cured, this material exhibits the property of rubber in that it is capable of accepting sheer stress without cracking or corroding in changeable climate or other atmospheric conditions. Such curable adhesives are well known, commercially available and widely used, so that further description here is unnecessary.

Various changes and modifications have been suggested and others will be obvious to those skilled in the art. Thus, it is intended that the present disclosure be taken as illustrative only and not limiting of the scope of the present invention.

What is claimed is:

1. A method of installing a glass window panel in a curved window opening of a vehicle, comprising the steps of: affixing about the edge bounding said curved window opening a window-engaging fastening means, said fastening means including a plurality of clips uniformly spaced and rigidly secured to said edge and of the type adapted to subsequently receive in engaged relation therewith a single, continuous reveal molding; applying a flat, planar, continuous gasketlike band of weather stripping along the inside face of said reveal molding; flexing a window panel sized to fit into said window opening from an initial flat configuration into a conforming curvature of said window opening; establishing engagement between said flexed window panel and said window-engaging fastening means by installing said reveal molding upon said clips for temporarily holding said window panel in said conforming curvature; applying a continuous bead of adhesive sealant into the space between the edge of said glass window panel and said frame created by the flexing of said window panel outwardly against said reveal molding; applying a dam of elastic material between said window opening edge and the periphery of said glass window panel so that said dam is in contact with said window opening edge and the periphery of said window panel; and curing said adhesive sealant to permanently hold said window panel in said conforming curvature and to complete a permanent weatherproof installation of said window panel.

* * * * *